March 14, 1944.  J. MEISTERHANS  2,344,102

NUT TO BE FIXED BY AN ADHESIVE

Filed Jan. 15, 1941

Inventor

Josef Meisterhans

By

Attorney

Patented Mar. 14, 1944

2,344,102

UNITED STATES PATENT OFFICE 2,344,102

NUT TO BE FIXED BY AN ADHESIVE

Josef Meisterhans, Gotha, Germany; vested in the Alien Property Custodian

Application January 15, 1941, Serial No. 374,464
In Germany December 19, 1939

5 Claims. (Cl. 85—32)

In my Patent Number 2,235,078, of March 18, 1941, the adhesively fixed nut is of a known type and is fixed in a non-metallic flange by riveting, pressing-in or screwing-in. In this art an adjustable building element capable of being simply affixed has long been needed. The present adjustable nut is employed in association with exchangeable building elements required in the building of airplanes on account of the inaccuracies of distance between holes, which inaccuracies often occur in the workshop.

This invention relates to an adjustable nut to be fixed by adhesive, which nut fills the above-mentioned needs. A nut of known type is inserted in a casing of sheet metal or in a pressed frame, and this frame together with the inserted nut is fixed by rivets, pressed or screwed into a non-metallic flange of any cross-section. This flange is then fixed by means of an adhesive to a building element. In this manner, a sturdy connection of the adjustable nut to the building element is provided. Also, the attached flange, when fixed by adhesive, serves as a bordering ring or washer for the hole and can also be considered as a reinforcing member when shearing stress occurs. Any tolerance difficulties in the workshop and the disagreeable experiences at the preliminary boring and fixation by means of wood screws, are therefore avoided by simply fixing this adjustable nut by an adhesive, and at the same time the possibility of exchanging during the building is guaranteed by the floating insertable nut.

Figure 1:
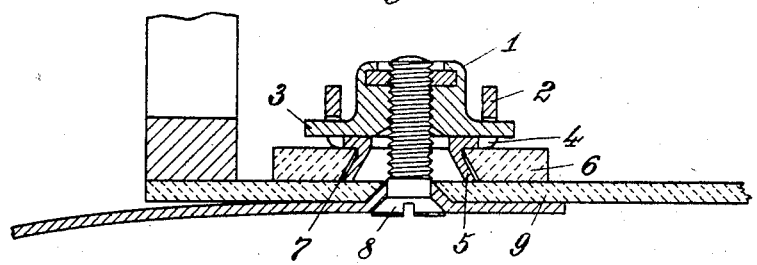
Figure 4:
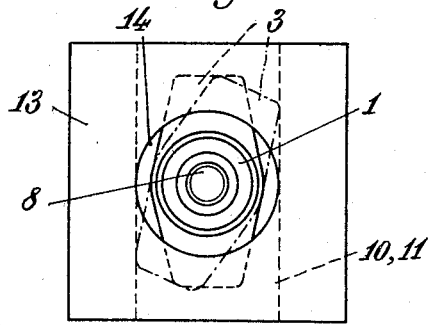

Two embodiments of the invention are illustrated by way of example in Figs. 1 and 4 of the accompanying drawing. A top plan and a cross-sectional view of each embodiment is shown.

Fig. 1 shows an inserted nut 1 laterally shiftable in all directions, which nut is held by a sheet metal frame 2. Although the nut can laterally shift in any direction, it is secured against turning beyond certain limits by noses or wings 3 engaging the walls of slits 4. This sheet metal frame 2 has a conical extension 5 adapted to be pressed by means of a conical tool into a non-metallic flange 6 so that the bore 7 in the non-metallic flange is outwardly flared at one end. An absolutely fixed connection between members 5 and 6 is ensured by having the presser extension 5 roughened on the outer side. This non-metallic flange 6 is painted with glue and tightly pressed against the building element, for instance a wall of plywood 9, by means of a screw 8. After the screw 8 has been loosened, the adjustable nut is integral with the building element 9, and the non-metallic flange 6 serves as a bridging or for reinforcing.

Figure 2:
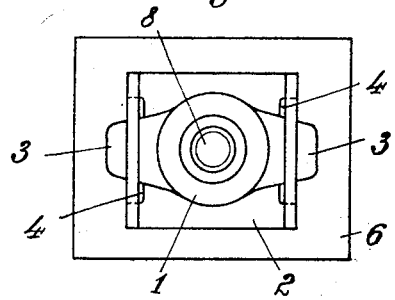
Figure 3:
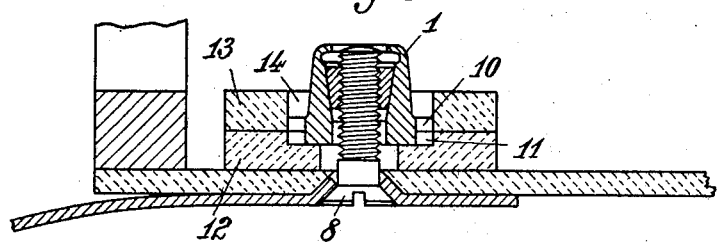

In the embodiment shown in Figs. 3 and 4, two non-metallic flanges 12 and 13, having longitudinal slots 11 and 10, respectively, are provided. These flanges are connected, one with the other, by an adhesive after the nut 1 has been inserted. Owing to the wider bore 14 and to the wide longitudinal slots 10 and 11, it is possible also in this form of invention to laterally shift nut in any direction. The rotation of the inserted nut in either direction is limited by the noses 3 which come to bear against the side walls of the longitudinal slots 10 and 11. The nut 12, 13 to be fixed by adhesive, shown in Figs. 3 and 4, is painted with glue like that shown in Figs. 1 and 2 and glued on the predetermined point, at which it serves at the same time as reinforcing element.

I claim:

1. In combination, a building element, a plate washer secured face to face to said element, a slotted nut retainer carried by said plate washer, and a winged nut supported by said retainer, the wings of said nut loosely engaging the slots in said retainer.

2. In combination, a building element, a non-metallic plate washer adhesively secured to said element, a nut having at least one radially projecting flange, and means secured to said washer for loosely securing said nut thereupon, said means including a second plate member having flange retaining means disposed in spaced relation to the periphery of said nut and also having a slot therein for receiving said flange, said slot having a substantially greater width in the plane of rotation of the nut than the width of said flange.

3. An anchorage device adapted to be attached to building elements by screws, bolts and the like, comprising a plate washer having a centrally disposed bore therein of a substantially greater diameter than the diameter of the screw, a nut having a pair of lateral flanges extending from the periphery thereof, a second plate member having flange retaining means disposed in spaced relation to the periphery of said nut and secured to said plate washer, said second plate member having a bore therein substantially larger than the diameter of said screw and coinciding with the bore in said plate washer and also coinciding with the bore in said nut, said flange retaining means including a pair of slots disposed in said second plate member for respectively receiving said pair of lateral flanges, each of said slots having a substantially greater width in the plane of rotation of the nut than the width of the associated flange whereby the nut will be permitted limited rotation and to shift in any lateral direction.

4. An anchorage device adapted to be attached to building elements by screws, bolts and the like, comprising a plate washer having a centrally disposed bore therein of a substantially greater diameter than the diameter of the screw, a nut having a pair of lateral flanges extending from the outer periphery thereof, a U-shaped plate member attached face to face with said plate washer, the outstanding legs of said U-shaped member being disposed in spaced relation to the periphery of said nut, said U-shaped plate member having a bore in the attached face thereof substantially larger than the diameter of said screw and coinciding with the bore in said plate washer and with the bore in said nut, the outstanding legs of the U-shaped member having a pair of slots therein for respectively receiving said pair of lateral flanges, each of said slots having a substantially greater width in the plane of rotation of the nut than the width of the associated flange, whereby the retained nut will be permitted limited rotation and to shift in any lateral direction.

5. An anchorage device adapted to be attached to building elements by screws, bolts and the like, comprising a non-metallic plate washer having a centrally disposed bore therein of a substantially greater diameter than the diameter of the screw, a nut having at least one lateral flange, a second non-metallic plate washer adhesively attached face to face to said first washer, said second washer having a bore therein of substantially greater diameter than said nut for surrounding the nut, one of said washers having a recess in the contacting face thereof communicating with the bore in said second washer and adapted to receive said lateral flange, said recess having a substantially greater width in the plane of rotation of said nut than said flange whereby the nut will be permitted limited rotation and to shift in any lateral direction.

JOSEF MEISTERHANS.